(12) United States Patent
Yamada et al.

(10) Patent No.: US 9,493,629 B2
(45) Date of Patent: Nov. 15, 2016

(54) MODIFIED BUTADIENE-BASED POLYMER COMPOSITION

(75) Inventors: Haruo Yamada, Tokyo (JP); Takaaki Matsuda, Tokyo (JP); Yuichi Kitagawa, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 1097 days.

(21) Appl. No.: 11/887,473

(22) PCT Filed: Mar. 29, 2006

(86) PCT No.: PCT/JP2006/306557
§ 371 (c)(1),
(2), (4) Date: Sep. 28, 2007

(87) PCT Pub. No.: WO2006/104215
PCT Pub. Date: Oct. 5, 2006

(65) Prior Publication Data
US 2009/0111933 A1 Apr. 30, 2009

(30) Foreign Application Priority Data

Mar. 29, 2005 (JP) ................ P.2005-094601

(51) Int. Cl.
*B60C 1/00* (2006.01)
*C08L 9/00* (2006.01)
*C08K 5/01* (2006.01)
*C08K 3/36* (2006.01)
*C08C 19/44* (2006.01)

(52) U.S. Cl.
CPC . *C08K 5/01* (2013.01); *C08K 3/36* (2013.01); *C08C 19/44* (2013.01)

(58) Field of Classification Search
CPC ............ C08K 3/36; C08K 5/01; C08L 15/00; C08L 19/006
USPC ............. 524/484, 492, 502, 571, 573, 575
See application file for complete search history.

(56) References Cited

U.S. PATENT DOCUMENTS

| 6,906,152 B2 * | 6/2005 | Saito et al. ............ 526/77 |
| 6,969,739 B1 * | 11/2005 | Saito et al. ............ 524/493 |
| 7,342,070 B2 | 3/2008 | Tsukimawashi et al. |
| 2003/0199669 A1 * | 10/2003 | Saito et al. ............ 528/393 |

FOREIGN PATENT DOCUMENTS

| CN | 1322223 A | 5/2001 |
| CN | 1578790 A | 4/2004 |
| EP | 0 260 325 | 3/1988 |
| EP | 1 153 972 | 11/2001 |
| EP | 1 275 660 | 1/2003 |
| EP | 1 457 501 | 9/2004 |
| JP | 11-286508 | 10/1999 |
| JP | 11-315108 | 11/1999 |
| JP | 2000-281835 | 10/2000 |
| JP | 2002-284814 | 10/2002 |
| JP | 2003-155381 | 5/2003 |
| JP | 2003-268041 | 9/2003 |

OTHER PUBLICATIONS

Chinese Office Action dated Sep. 18, 2009 and English translation thereof.
Supplementary European Search Report for EP Application No. 06730505.2 dated Jul. 20, 2010.

* cited by examiner

*Primary Examiner* — Alexa Neckel
*Assistant Examiner* — Marie Reddick
(74) *Attorney, Agent, or Firm* — Finnegan, Henderson, Farabow, Garrett & Dunner, L.L.P.

(57) ABSTRACT

An object of the present invention is to improve, in the raw material rubber compound particularly using a silica-based filler, which is used for tire tread, the balance between the rolling resistance and the skid resistance on a wet road surface and at the same time, improve the wear resistance is enhanced. The present invention provides an oil-extended polymer composition comprising 100 parts by weight of (A) a polymer having a number average molecular weight Mn of 500,000 to 700,000 and a content of a functional group-containing polymer component to be adsorbed to silica of 50 wt % or more, and from 20 to 60 parts by weight of (B) an extender oil.

4 Claims, 1 Drawing Sheet

MODIFIED BUTADIENE-BASED POLYMER COMPOSITION

TECHNICAL FIELD

The present invention relates to an oil-extended rubber composition comprising a specific modified butadiene-based polymer. More specifically, the present invention relates to an oil-extended rubber composition comprising a modified butadiene-based polymer, which has a high molecular weight and a high percentage content of a butadiene-based polymer having a modification component effective for a silica-based filler.

The modified butadiene-based polymer composition of the present invention is suitably used for applications, mainly tires, for which a butadiene-based polymer rubber has been conventionally used, or other industrial products and the like.

BACKGROUND ART

In recent years, along with the glowing concern about environmental problems, a demand for reducing the amount of a carbon dioxide gas discharged from automobiles is increasing. For satisfying such a requirement, it is also demanded in terms of the tire performance to reduce the rolling resistance. As for the tire performance, the rolling resistance and the skid resistance on a road surface are competing performances, and trade-off balance therebetween is important. At the same time, improvement of wear resistance is also a big problem to be solved.

As regards the technique for improving the balance between the rolling resistance and the skid resistance on a wet road surface, a method by optimizing the tire structure has been also studied, but the method most commonly employed is to use a low heat-generating material as the rubber composition. Above all, a method of modifying the end of a conjugated diene-based polymer with a functional group is becoming popular as a most representative technique.

As regards the technique for introducing a functional group into the end of a conjugated diene-based polymer, a method described, for example, in WO01-23467, is used in general, where polymerization of 1,3-butadiene or copolymerization of 1,3-butadiene and styrene is performed using an organic lithium catalyst in a hydrocarbon solvent, and the active end of the polymer and a modifier reactable therewith are reacted, thereby introducing a functional group. Various modified conjugated diene-based polymers suitable for various applications have been proposed using such a technique. However, improvement of the wear resistance is not satisfactorily achieved.

On the other hand, an attempt has been made to improve various performances by increasing the molecular weight. However, the anionic polymerization using an organic lithium catalyst has a problem that trace impurities, particularly water, acetylenes, allenes and the like, in the raw material monomer react with the active lithium end of the polymer to inactivate the active end. Also, the active lithium end sometimes causes a reaction of decomposing by itself to produce lithium hydride and kill the end. In particular, such a side reaction becomes a serious trouble at the production of a modified conjugated diene-based polymer, because the absolute amount of the active end needs to be reduced for increasing the molecular weight. Thus, there is a problem that as the molecular weight is made higher, the residual ratio of active lithium end at the completion of polymerization is liable to decrease. Dehydration and purification of the monomer and solvent are important, but these are not sufficiently effective in the industrial-scale production and on the other hand, a tremendous cost is economically necessary at present for obtaining sufficiently high effects. In order to solve these impurity problems, JP-A-59-176311 (the term "JP-A" as used herein means an "unexamined published Japanese patent application") has proposed to bring 1,3-butadiene and a hydrocarbon solvent into mixing contact with an organic lithium compound and then perform the polymerization. Also, JP-A-11-199712 has proposed coupling by various functional compounds for increasing the molecular weight. However, an effective countermeasure is not taken against the problem that the active lithium end causes a reaction of decomposing by itself to produce lithium hydride and kill the end. It is still difficult at present to achieve both a molecular weight increase and a high modification ratio at the same time.

Patent Document 1: WO01-23467
Patent Document 2: JP-A-59-176311
Patent Document 3: JP-A-11-199712

DISCLOSURE OF THE INVENTION

Problems that the Invention is to Solve

An object of the present invention is to provide a rubber using a modified butadiene-based polymer, where the balance between the rolling resistance and the skid resistance on a wet road surface is improved and at the same time, the wear resistance is enhanced.

Means for Solving the Problems

As a result of intensive studies on the structure of a modified butadiene-based polymer to solve those problems, the present inventors have found that the above-describe object can be attained by an oil-extended rubber composition comprising a specific modified butadiene-based polymer. The present invention has been accomplished based on this finding.

That is, the present invention is an oil-extended rubber composition comprising a modified butadiene-based polymer, which has a high molecular weight and a high percentage content of a butadiene-based polymer having a modification component effective for a silica-based filler.

More specifically, the present invention provides:

1. An oil-extended polymer composition comprising 100 parts by weight of (A) a polymer having a number average molecular weight Mn of 500,000 to 700,000 and a content of a functional group-containing polymer component to be adsorbed to silica of 50 wt % or more, and from 20 to 60 parts by weight of (B) an extender oil;

2. The oil-extended polymer composition of 1) above, wherein the molecular weight distribution Mw/Mn by GPC of the polymer (A) is from 1.6 to 2.5 and polymer components having a molecular weight of 100,000 or more contained in the polymer (A) have a monomodal distribution;

3. The oil-extended polymer composition of 1) above, wherein the polymer (A) is a modified butadiene-based polymer obtained by performing polymerization of 1,3-butadiene or copolymerization of 1,3-butadiene and another copolymerizable conjugated diene and/or aromatic vinyl compound by using an organic lithium compound as an initiator in a hydrocarbon solvent and then reacting an active end of the obtained diene-based polymer with a reactable functional group-containing compound, and wherein the modified butadiene-based polymer is produced by a production method comprising:

(1) using a monomer with the total amount of acetylenes and allenes as impurities being less than 200 ppm based on all monomers, (2) supplying the monomer or the monomer and a hydrocarbon solvent to a polymerization reactor after treatment with an organic metal compound, (3) continuously polymerizing the monomer by using two or more connected polymerization reactors, and (4) performing the polymerization at a temperature of 50 to 85° C.;

4. The oil-extended polymer composition of 1) above, wherein the functional group-containing component in the polymer (A) is a modified butadiene-based polymer modified using a low molecular weight organic compound having an amino group and an epoxy group; and 5. A rubber composition for vulcanization, comprising the oil-extended polymer composition of 1) above and, per 100 parts by weight of the oil-extended polymer composition, from 20 to 100 parts by weight of a silica-based filler and from 1.0 to 20 parts by weight of a vulcanizing agent and a vulcanization accelerator.

Effects of the Invention

The oil-extended rubber composition comprising a specific modified butadiene-based polymer of the present invention is assured of good processability at the compounding by virtue of using a compounding formulation containing a silica-based filler and provides a vulcanized rubber composition for tire tread, which can give a vulcanized rubber excellent in the strength property, fuel-cost saving performance, gripping performance and wear resistance. Also, the oil-extended rubber composition of the present invention can be suitably used for various automobile parts, industrial articles, other rubber products and the like.

BEST MODE FOR CARRYING OUT THE INVENTION

Figure 1:
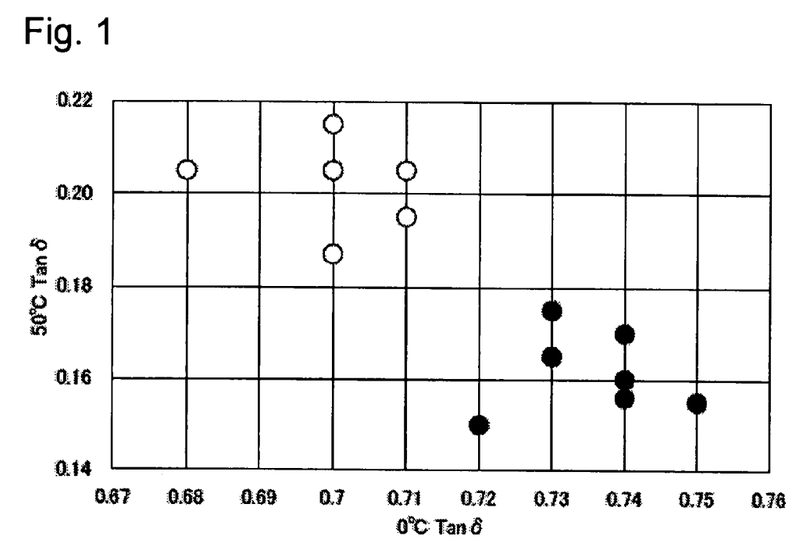
FIG. 1 A schematic view showing the performance balance (balance between low-temperature Tan δ and high-temperature Tan δ) of the modified butadiene-based polymer according to the present invention.
Figure 2:
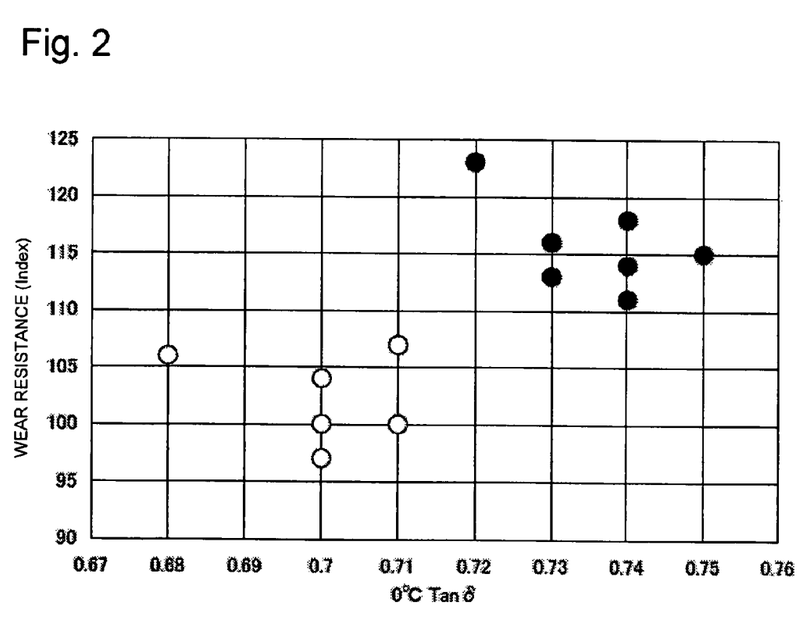
FIG. 2 A schematic view showing the performance balance (balance between low-temperature Tans and wear resistance) of the modified butadiene-based polymer according to the present invention.

The present invention is described in detail below.

The polymer (A) for use in the present invention is a butadiene-based polymer. The butadiene-based polymer includes a polymer of 1,3-butadiene alone, where the constituent monomer unit mainly comprises 1,3-butadiene; and a copolymer where the constituent monomer unit comprises 1,3-butadiene and another copolymerizable conjugated diene and/or aromatic vinyl compound. Examples of the other copolymerizable conjugated diene include isoprene, 3-dimethyl-1,3-butadiene, 1,3-pentadiene, 3-methyl-1,3-pentadiene, 1,3-heptadiene and 1,3-hexadiene. The butadiene-based polymer comprising conjugated dienes is preferably a butadiene polymer or a butadiene-isoprene copolymer. Examples of the other copolymerizable aromatic vinyl compound include α-methylstyrene, p-methylstyrene, vinylethylbenzene, vinylxylene, vinylnaphthalene and 1,1-diphenylethylene. In the case where the polymer (A) for use in the present invention is a copolymer comprising a conjugated diene and an aromatic vinyl, a butadiene-styrene copolymer or a butadiene-isoprene-styrene copolymer is preferred. The composition distribution of the monomer copolymerizable with butadiene in the copolymer chain may be uniform in the molecular chain, may be non-uniform in the molecular chain, or may be a distribution with the monomer gradually decreasing or increasing along the molecular chain, or the monomer may be present as a block. As regards the block structure, for example, in the case of a block of a random copolymer comprising butadiene and styrene, blocks differing in the ratio between butadiene and styrene may be connected. The composition distribution of the monomer copolymerizable with the conjugated diene in the copolymer chain used for tires is preferably uniform in the molecular chain, and the styrene copolymerized is preferably random-copolymerized. The random copolymer as used herein means a copolymer containing a small amount of or no component having a styrene chain length of 30 or more. Specifically, the random copolymer is preferably a copolymer where according to a known method of decomposing the polymer by the Kolthoff's method and analyzing the amount of polystyrene unnecessary for methanol, the content of such a component is 10 wt % or less, preferably 5 wt % or less, based on the amount of the polymer; or a copolymer where according to a known method of decomposing the polymer by a ozone decomposition method and analyzing the styrene chain distribution by GPC, the isolated styrene, that is, styrene having a styrene unit chain of 1, accounts for 40 wt % or more of all bound styrenes and the long-chain block styrene, that is, styrene having a styrene unit chain of 8 or more, accounts for 5 wt % or less of all bound styrenes.

In the case where the polymer (A) is a butadiene-styrene copolymer or a butadiene-isoprene-styrene copolymer, the bound styrene component preferably accounts for 1 to 50 wt %. Within this range, the composition is preferably used for normal rubber usage. In the case of using the composition for tires of which high gripping performance is required, the copolymerized styrene component in the polymer (A) preferably accounts for 25 to 50 wt %. Within this range, in terms of usage for a so-called high-performance tire required to have high gripping performance, a rubber assured of excellent balance between the rolling resistance and the skid resistance on a wet road surface and excellent wear resistance, which is the object of the present invention, is provided.

The polymer (A) for use in the present invention is a polymer having a number average molecular weight Mn of 500,000 to 700,000 and a content of a functional group-containing polymer component to be adsorbed to silica of 50 wt % or more. Within this range, the effects of the present invention, particularly, excellent balance between the rolling resistance and the skid resistance on a wet road surface as well as good wear resistance, are obtained. Even when the molecular weight is within the range above, if the content of a functional group-containing polymer component to be adsorbed to silica is not 50 wt % or more, the effects in terms of the above-described balance and wear resistance are insufficient. Also, even when the content of a functional group-containing polymer component to be adsorbed to silica is 50 wt % or more, if the molecular weight is out of the range above, the effects in terms of the above-described balance and wear resistance are insufficient.

The content of a functional group-containing polymer component to be adsorbed to silica must be 50 wt % or more based on the entire polymer. The content is preferably 60 wt % or more. If the content of this modification component is small, the effects of the functional group are not sufficiently brought out.

In the polymer (A) for use in the present invention, preferably, the molecular weight distribution Mw/Mn by GPC is from 1.6 to 2.5 and the polymer component having a molecular weight of 100,000 or more has a monomodal distribution. With such a molecular weight distribution, good processability and good dispersion of a filler at the kneading of rubber are ensured and the effects of the present invention, particularly, excellent balance between the rolling resistance and the skid resistance on a wet road surface as well as good wear resistance, are obtained. The "monomodal" distribution means a distribution in the form of having one peak and includes those where the peak is sharpened or trapezoidal or a shoulder is present on the low molecular or high molecular side with respect to the peak. Mw/Mn is more preferably 1.8 or more in view of processability and wear resistance and, similarly, more preferably 2.3 or less in view of rolling resistance.

The number average molecular weight Mn, the weight average molecular weight Mw and the molecular weight distribution are analyzed by GPC. The average molecular weight is measured by calculation according to a normal method using a calibration curve based on the molecular weight of standard polystyrene. In the present invention, a non-adsorptive polystyrene-based gel is used as the filler for the measurement of molecular weight and molecular weight distribution of the polymer (A).

The weight fraction of the functional group-containing polymer component to be adsorbed to silica is measured by a method using GPC with the filler being a silica-based gel, where by utilizing the property of the modified butadiene-based polymer adsorbing to silica, a sample solution containing a sample and a low molecular weight polystyrene as the internal standard is subjected to GPC on the non-adsorptive polystyrene-based gel and GPC on the silica-based gel and from the difference between the chromatograms obtained, the adsorption amount to the silica-based gel is determined.

The present invention is an oil-extended polymer composition comprising 100 parts by weight of a polymer (A) and from 20 to 60 parts by weight of an extender oil (B). The extender oil includes an aromatic oil, a naphthene oil and a paraffin oil. Furthermore, for example, TDAE, MES and SRAE described in *Kautschuk Gummi Kunststoffe*, 52(12), 799 (1999) are preferably used, which are an oil having a PCA content of 3 wt % or less as measured by the IP346 method. An oil having a PCA content of 3 wt % or less, such as TDAE and SRAE, is more preferred. When TDAE or SRAE is used, a vulcanized rubber excellent in the strength property, fuel-cost saving performance, gripping performance and wear resistance is obtained. The extender oil may be used in an arbitrary amount within the range of the extender oil (B) being from 20 to 60 parts by weight per 100 parts by weight of the polymer (A), but the Mooney viscosity of the oil-extended composition is preferably from 30 to 100, because the production and processing are easy. The upper limit of the Mooney viscosity varies depending on the kneading method or the composition of other compounding ingredients. Also, the processing is facilitated by preheating. In this way, the upper limit varies depending on various conditions and cannot be indiscriminately specified but seems to be about 130. For improving the dispersion of a filler at the kneading of rubber, the Mooney viscosity is more preferably 50 or more, still more preferably 75 or more. Although depending on the component composition and viscosity of oil, in the case of an oil ordinarily used, it is preferred that when the extender oil (B) is 60 parts by weight per 100 parts by weight of the polymer (A), the Mooney viscosity is 50 or more; similarly, when the extender oil (B) is 50 parts by weight, the Mooney viscosity is 60 or more; and similarly, when the extender oil (B) is 37.5 parts by weight, the Moony viscosity is 75 or more. Incidentally, the Mooney viscosity is a value obtained by measuring the oil 4 minutes after preheating at 100° C. for 1 minute using an L rotor.

The polymer (A) for use in the present invention is preferably a modified butadiene-based polymer obtained by performing polymerization of 1,3-butadiene or copolymerization of 1,3-butadiene and another copolymerizable conjugated diene and/or aromatic vinyl compound by using an organic lithium compound as an initiator in a hydrocarbon solvent and then reacting an active end of the obtained diene-based polymer with a reactable functional group-containing compound, wherein the modified butadiene-based polymer is produced by a production method comprising:

(1) using a monomer with the total amount of acetylenes and allenes as impurities being less than 200 ppm based on all monomers, (2) supplying the monomer or the monomer and a hydrocarbon solvent to a polymerization reactor after treatment with an organic metal compound, (3) continuously polymerizing the monomer by using two or more connected polymerization reactors, and (4) performing the polymerization at a temperature of 50 to 85° C.

According to this production method, the polymer (A) for use in the present invention can be easily produced.

Furthermore, in the polymerization, the average residence time in one polymerization vessel is preferably from 15 minutes to 1 hour and 30 minutes, more preferably from 20 minutes to 1 hour, and the reactable functional group-containing low molecular weight compound is preferably added and reacted at the time where the polymerization conversion ratio is from 90 to 99%, or within 5 minutes after the conversion ratio reaches 100%. In this case, a polymer having a number average molecular weight Mn of 500,000 to 700,000 and a content of a functional group-containing polymer component to be adsorbed to silica of 50 wt % or more, where the molecular weight is higher and the amount of modified components is larger, is obtained. If the residence time in the polymerization vessel is unnecessarily long or a long time is passed in the state without a monomer, the active end of the polymer is dimerized or deactivated due to a side reaction and the desired high modification ratio cannot be obtained.

The hydrocarbon solvent used at the polymerization of the polymer (A) for use in the present invention is preferably a saturated hydrocarbon or an aromatic hydrocarbon, and an aliphatic hydrocarbon such as butane, pentane, hexane, pentane and heptane, an alicyclic hydrocarbon such as cyclopentane, cyclohexane, methyl-cyclopentane and methylcyclohexane, an aromatic hydrocarbon such as benzene, toluene and xylene, or a hydrocarbon comprising a mixture thereof is used.

As regards the initiator at the polymerization of the polymer (A) for use in the present invention, an organic lithium compound is used. The organic lithium compound includes all organic lithium compounds having a polymerization initiating ability, and examples thereof include an organic lithium compound having a low molecular weight, an organic lithium compound of solubilized oligomer, an organic lithium compound having single lithium within one molecule or a plurality of lithiums within one molecule, and an organic lithium compound having, in terms of the bonding manner of organic group and lithium, a carbon-lithium bond, a nitrogen-lithium bond or a tin-lithium bond.

Specific examples thereof include a monoorganic lithium compound such as n-butyl lithium, sec-butyl lithium, tert-butyl lithium, n-hexyl lithium, benzyl lithium, phenyl lithium and stilbene lithium; a polyfunctional organic lithium compound such as 1,4-dilithiobutane, reaction product of sec-butyl lithium with diisopropenylbenzene, 1,3,5-trilithiobenzene, reaction product of n-butyl lithium with 1,3-butadiene and divinylbenzene, reaction product of n-butyl lithium with polyacetylene compound; and a compound having a nitrogen-lithium bond, such as dimethylaminolithium, dihexylaminolithium, diisopropylaminolithium and hexamethyleneiminolithium. Among these, n-butyl lithium and se-butyl lithium are preferred. One of these organic lithium compounds may be used, or two or more thereof may be used as a mixture.

In the polymerization reaction, a small amount of a polar compound may be added as the vinylating agent of the butadiene-based monomer for the purpose of randomly copolymerizing a styrene-based monomer with the butadiene system. Examples of the polar compound used here include ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene and 2,2-bis(2-oxolanyl)-propane; a tertiary amine compound such as tetramethylethylenediamine, dipiperidinoethane, trimethylamine, triethylamine, pyridine and quinuclidine; an alkali metal alkoxide compound such as potassium tert-amylate and potassium tert-butylate; and a phosphine compound such as triphenylphosphine.

One of these polar compounds may be used alone, or two or more thereof may be used in combination. The amount of the polar compound used is selected according to the purpose and the degree of extent. Usually, the polar compound is used in an amount of 0.01 to 100 mol per mol of the initiator.

The polar compound can be used in an appropriate amount according to the desired vinyl bond amount, as the microstructure controlling agent for the polymer diene moiety. Many of vinylating agents also have a randomizing effect effective in the copolymerization of conjugated dienes and an aromatic vinyl compound and can be used for adjusting the styrene distribution or as the styrene block amount-adjusting agent.

The method for randomization may be, as described in JP-A-59-140211, a method of continuously or intermittently adding a part of 1,3-butadiene in the midway of the copolymerization. If desired, butadiene, styrene or a mixture thereof may be additionally added, for example, from the top part of the first reactor or from the bottom part of the second or subsequent reactor. Also in this case, the monomer supplied to each part may be treated with an organic metal compound.

By virtue of using a polar compound, especially ethers or a tertiary amine compound, the conjugated diene unit of the copolymer can be vinylated. Particularly, in the rubber for tires, the vinyl content of the butadiene unit is suitably from 20 to 80 mol %. In the so-called high-performance tire required to have high gripping performance, the vinyl content is suitably from 35 to 60 mol %. Within this range, a rubber assured of excellent balance between the rolling resistance and the skid resistance on a wet road surface and excellent wear resistance, which is the object of the present invention, is provided.

As for the impurities in all monomers used for the production of the polymer (A) of the present invention, the total weight of acetylenes and allenes is less than 200 ppm. If a monomer containing 200 ppm or more of impurities is treated with an organic metal compound, the metal compound of acetylenes and allenes, which is a reaction product, further deactivates the active end of the polymer in the polymerization system and this is not preferred. The total amount of impurities is preferably 100 ppm or less, more preferably 80 ppm or less.

The amount of impurities contained in the conjugated diene-based monomer is preferably such that 1,2-butadiene and propadiene as allenes are less than 200 ppm and 50 ppm or less, respectively, and the acetylenes is 80 ppm or less, more preferably 1,2-butadiene is less than 100 ppm, propadiene is 30 ppm or less and the acetylenes is 60 ppm or less, still more preferably 1,2-butadiene is less than 50 ppm, propadiene is 20 ppm or less and the acetylenes is 30 ppm or less.

The amount of phenylacetylene contained in the aromatic vinyl monomer is preferably 80 ppm or less, more preferably 50 ppm or less.

Examples of the organic metal compound used for the treatment of the monomer or treatment of the monomer and hydrocarbon solvent include an organic lithium compound, an organic sodium compound and an organic magnesium compound, and specific examples thereof include n-butyl lithium, sec-butyl lithium, tert-butyl lithium, n-hexyl lithium, benzyl lithium, phenyl lithium, stilbene lithium, sodium naphthalene and dibutyl magnesium. Also, in order to efficiently perform the reaction with impurities, a polar compound such as ethers, amines, phosphines and sulfides may be used in combination and the organic metal compound may be thereby activated.

As for the treating method, a method of previously bringing an organic metal compound in an amount corresponding to the impurities into mixing contact with the monomer or with the monomer and a hydrocarbon solvent and thereafter introducing the monomer or the monomer and a hydrocarbon solvent into the reactor is preferred. The hydrocarbon solvent used for the polymerization is recovered in the finishing step after polymerization, then purified and reused. In this case, acetylenes and allenes as the impurities in the monomer are mixed in the hydrocarbon solvent and these impurities cannot be completely removed even after purification. Therefore, the allenes and acetylenes in the hydrocarbon solvent need to be also treated with an organic metal compound.

The mixing contact treatment is preferably performed at a temperature of −10 to 50° C. If the mixing contact temperature is less than −10° C., the reaction of the organic metal compound with impurities insufficiently proceeds and in turn the impurities are not satisfactorily inactivated, whereas if the mixing contact temperature exceeds 50° C., the polymerization starts before the monomer and the like enters the polymerization vessel to readily produce a gel in the mixing portion and this is not preferred. The mixing contact time is preferably as short as less than 5 minutes. The monomer should be controlled not to exceed an addition ratio of 10% before entering the polymerization vessel. One of these methods is used alone or some of the methods are used in combination, whereby the deactivation of the active end can be greatly reduced from occurring in the midway of the polymerization due to impurities contained in the monomer and the modification reaction can be industrially performed with good efficiency.

In the mixing contact treatment, the mixing is preferably performed in pipeline or, if desired, using an orifice or in-line mixer.

The polymerization reaction is continuously performed in two or more connected reactors. At this time, the residence time distribution is appropriately limited and the active lithium end is prevented from causing a reaction of decomposing by itself to produce lithium hydride and kill the end, so that a sufficiently high modification ratio can be obtained by the modification reaction performed in the later step. Also, the molecular weight distribution can be controlled to a preferred range and can be a monomodal distribution. The number of reactors connected is preferably 2 or 3. If the number of reactors connected is unnecessarily large, this is not only preferred in view of profitability but also may give a polymodal molecular weight distribution. It is not recommendable to use 5 or more reactors. The reactor is preferably a bath-type reactor with a stirrer, which is usually used.

In any reactor, the polymerization is performed at a temperature of 50 to 85° C. If the polymerization temperature is less than 50° C., the polymerization reaction proceeds slowly and the yield is bad, whereas if the polymerization temperature exceeds 85° C., a side reaction makes it unable to obtain a sufficiently high modification ratio by the modification reaction performed in a later step or obtain a copolymer having a sufficiently high molecular weight. The polymerization reaction is performed in a concentration range such that the final polymer concentration is from 5 to 30 wt %, and the polymerization temperature is controlled by the feed temperature of monomer or solvent, the monomer concentration or the cooling or heating from outside the reactor by taking into consideration that the polymerization is a heat-generating reaction. The polymerization is preferably performed at 50 to 85° C., more preferably from 60 to 80° C.

Subsequent to the polymerization reaction, a modification reaction is performed in a reactor where a modifier is added to a solution of a polymer having an active lithium end and thoroughly mixed. The reactor may be a bath-type reactor with a stirrer, which is the same as that used for the polymerization, may be a bath-type reactor with a stirrer, which is smaller than the polymerization vessel, or may be a static mixer. It is necessary that the mixing is thoroughly performed, and the necessary volume is determined by the stirring efficiency.

The volume of a bath-type reactor with a stirrer is, under the turbulent condition, preferably from 1/20 to 1/5 that of the polymerization vessel. A thorough mixing condition and a short residence time are more preferred in view of profitability and preventing a side reaction. The residence time is preferably from 1 minute to 1 hour, more preferably from 1 to 15 minutes. The modification reaction is preferably performed at a temperature of 50 to 85° C.

The modifier is selected from modifiers having a low molecular weight and being capable of reacting with the active end of the polymer and allowing the polymer to be adsorbed to silica. The molecular weight is 1,000 or less. Examples thereof include the followings.

(1) A Low Molecular Weight Organic Compound Having an Amino Group and an Epoxy Group within the Molecule This is a low molecular weight compound where the amino group is a tertiary amino group, the molecular weight is 1,000 or less and depending on the case, a repeating unit may or may not be present.

Specific examples thereof include an epoxy group-containing tertiary amine such as 4,4'-diglycidyl-diphenylmethylamine and 4,4'-diglycidyl-dibenzylmethyl-amine; a diglycidylamino compound such as diglycidyl aniline, diglycidyl orthotoluidine, tetraglycidyl methaxylenediamine, tetraglycidylaminodiphenylmethane, tetraglycidyl-p-phenylenediamine, diglycidyl aminomethyl-cyclohexane and tetraglycidyl-1,3-bisaminomethylcyclo-hexane; and an oligomer of such an amino group-containing epoxy compound. Among these, a compound having an amino group and a plurality of epoxy groups within the molecule is preferred, a diglycidylamino group-containing poly-functional compound is more preferred, and tetraglycidyl-1,3-bisaminomethylcyclohexane is still more preferred.

When such a low molecular weight organic compound having an amino group and an epoxy group is reacted with the active lithium of the polymer, a part of the epoxy group is converted into an alkoxy group. When a plurality of epoxy groups are reacted, a plurality of polymers are bonded to bring about coupling and this provides a condition that the alkoxylithium further reacts with the epoxy group and at the same time, a part of the epoxy group remains and is present in a state of being bound to the polymer. As a result, a modified polymer where a tertiary amine, a hydroxyl group, an ether group and an epoxy group are present in the polymer is obtained. This modified polymer is stable in the production process, is stable even when stored as an oil-extended composition at room temperature for several months, and is industrially very useful.

(2) A Low Molecular Weight Organic Compound Having an Amino Group and an Alkoxysilyl Group within the Molecule This is a low molecular weight compound where the amino group is a tertiary amino group or a primary or secondary amino group protected by a trialkylsilyl group, the molecular weight is 1,000 or less and depending on the case, a repeating unit may or may not be present.

Specific examples thereof include a low molecular weight compound having a trialkylsilylamino group and an alkoxysilyl group within the molecule, such as N,N-bis(trimethylsilyl)aminoropylmethyldimethoxysilane, N,N-bis(trimethylsilyl)aminopropylmethoxysilane, N,N-bis(triethylsilyl)aminopropyltrimethoxysilane, N,N-bis(triethylsilyl)aminopropylethyldiethoxysilane, N,N-bis(triethylsilyl)aminopropylmethyldimethoxysilane, N,N-bis(trimethylsilyl)aminopropylmethyldiethoxysilane and 1-trimethylsilyl-2,2-dimethoxy-1-aza-2-silacyclopentane.

Other examples include a low molecular weight compound having an amino group and an alkoxysilyl group within the molecule, such as 3-dimethylaminopropyltriethoxysilane, 3-diethylaminopropylmethyldiethoxysilane, 3-hexamethylene-iminopropyltriethoxysilane, N-(3-dimethoxymethylsilyl-propyl)-4,5-dihydroimidazole, N-(1,3-dimethylbutylidene)-3-(triethoxysilyl)-1-propanamine, N-(1-methylethylidene)-3-(triethoxysilyl)-1-propanamine and 3-(2-dimethylamino-ethyl)methylaminopropyltriethoxysilane.

(3) A Low Molecular Weight Compound Selected from N-Substituted Aminoaldehydes, N-Substituted Aminothioaldehydes, N-Substituted Aminoketones and N-Substituted Aminothioketones Specific examples thereof include N-substituted aminoketones such as 4-dimethylaminobenzophenone, 4-diethylaminobenzophenone, 4-di-tert-butylaminobenzophenone, 4-diphenylaminobenzophenone, 4,4'-bis(dimethylamino)benzophenone, 4,4'-bis(diethylamino)benzophenone, 4,4'-bis(di-tert-butylamino)benzophenone, 4,4'-bis(diphenylamino)benzo-phenone, 4,4'-bis(divinylamino)benzophenone, 4-dimethyl-aminoacetophenone, 4-diethylaminoacetophenone, 1,3-bis(diphenylamino)-2-propanone and 1,7-bis(methylethyl-amino)-4-heptanone, and corresponding N-substituted aminothioketones; N-substituted aminoaldehydes such as 4-diethylaminobenzaldehyde and 4-divinylaminobenzaldehyde, and corresponding N-substituted aminothioaldehydes.

Other examples include N-methyl-β-propiolactam, N-tert-butyl-β-propiolactam, N-phenyl-β-propiolactam, N-methoxyphenyl-β-propiolactam, N-naphthyl-β-propiolactam, N-methyl-2-pyrrolidone, N-tert-butyl-2-pyrrolidone, N-phenyl-pyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-methyl-3,3'-dimethyl-2-pyrrolidone, N-tert-butyl-3,3'-dimethyl-2-pyrrolidone, N-phenyl-3,3'-dimethyl-2-pyrrolidone, N-methyl-2-piperidone, N-tert-butyl-2-piperidone, N-phenyl-piperidone, N-methoxyphenyl-2-piperidone, N-vinyl-2-piperidone and N-benzyl-2-piperidone.

Other examples include N-substituted lactams such as N-naphthyl-2-piperidone, N-methyl-3,3'-dimethyl-2-piperidone, N-phenyl-3,3'-dimethyl-2-piperidone, N-methyl-ε-caprolactam, N-phenyl-ε-caprolactam, N-methoxyphenyl-ε-caprolactam, N-vinyl-ε-caprolactam, N-benzyl-ε-caprolactam, N-naphthyl-ε-caprolactam, N-methyl-ω-laurylolactam, N-phenyl-ω-laurylolactam, N-tert-butyl-laurylolactam, N-vinyl-ω-laurylolactam and N-benzyl-ω-laurylolactam, and thiolactams corresponding thereto.

Other examples include N-substituted ethyleneureas such as 3-dimethyl-2-imidazolidinone, 1,3-diethyl-2-imidazolidinone, 1,3-dipropyl-2-imidazolidinone, 1-methyl-3-ethyl-2-imidazolidinone, 1-methyl-3-propyl-2-imidazolidinone, 1-methyl-3-thyl-2-imidazolidinone, 1-methyl-3-2-ethoxyethyl)-2-imidazolidinone and 1,3-dimethyl-3,4,5,6-tetrahydropyrimidinone, and corresponding N-substituted thioureas.

(4) A Low Molecular Weight Compound Selected from Compounds which are Benzophenones or Thiobenzophenones Having at Least One Amino Group Specific examples thereof include a benzophenone and a thiobenzophenone, each having at least one amino group, alkylamino group or dialkylamino group in one or both of the benzene rings, such as 4,4'-bis(dimethylamino)-benzophenone, 4,4'-bis(diethylamino)-benzophenone, 4,4'-bis(dibutyl-amino)-benzophenone, 4,4'-diaminobenzophenone, 4-dimethyl-aminobenzophenone, and corresponding thiobenzophenone.

(5) A Low Molecular Weight Compound Selected from Isocyanate Compounds and Isothiocyanate Compounds Specific examples thereof include an isocyanate compound such as 2,4-tolylene diisocyanate, 2,6-tolylene diisocyanate, diphenylmethane diisocyanate, naphthalene diisocyanate, trizine diisocyanate, triphenylmethane triisocyanate, p-phenylene diisocyanate, tris(isocyanatophenyl)thiophosphate, xylylene diisocyanate, benzene-1,2,4-triisocyanate, naphthalene-1,2,5,7-tetraisocyanate, naphthalene-1,3,7-triisocyanate, phenyl isocyanate, hexamethylene diisocyanate, methylcyclohexane diisocyanate and phenyl-1,4-diisothiocyanate.

An aromatic isocyanate compound such as aromatic diisocyanate or triisocyanate, dimer or trimer of various aromatic isocyanate compounds, and adduct obtained by reacting an aromatic isocyanate above with polyol or polyamine, is preferred, and an aromatic polyisocyanate compound such as 2,4-tolylene diisocyanate, diphenylmethane diisocyanate and naphthalene diisocyanate is more preferred.

The modifier is reacted at a ratio of more than 0.2 molar amount to the active end of the polymer and 5-fold molar amount or less to the active end of the polymer. In this case, a polymer having a high modification ratio, which is the object of the present invention, is obtained. If the ratio exceeds 5-fold molar amount, not only this is unprofitable but also the unreacted modifier increases and the performance rather decreases.

The modified butadiene-based polymer produced in the present invention has a high molecular weight and has a number average molecular weight Mn of 500,000 or more in terms of polystyrene. If the number molecular weight is less than 500,000, a good tire composition such as sufficiently high strength or wear resistance and low rolling resistance cannot be obtained. The molecular weight is controlled by the amount of the initiator, and the reciprocal of the molar amount of the active end after removing the amount consumed by impurities or inactivated due to a side reaction in the midway is nearly proportional to the number average molecular weight of the polymer. However, when a coupling reaction occurs at the same time due to modification after the polymerization, the increase in the molecular weight by the coupling reaction should be taken into consideration. If the number average molecular weight Mn exceeds 700,000, the functional group-containing polymer component is adsorbed to silica and can be hardly maintained to account for 50 wt % or more.

If desired, a deactivating agent, a neutralizer and the like may be added to the polymer solution after the modification reaction. Examples of the deactivating agent include water and alcohols such as methanol, ethanol, isopropanol, and examples of the neutralizer include a carboxylic acid such as stearic acid, oleic acid and versatic acid, an aqueous solution of inorganic acid, and a carbon dioxide gas. Also, the polymer (A) for use in the present invention itself has a high viscosity and therefore, in order to prevent production of a gel in the finishing step after polymerization or enhance the stability at the processing, a known stabilizer for rubbers, such as 2,6-di-tert-butyl-4-methylphenol (BHT), n-octadecyl-3-(4'-hydroxy-3',5'-di-tert-butylphenol)propionate and 2-methyl-4,6-bis[(octylthio)methyl]phenol, is preferably added.

It is preferred that a predetermined amount of an extender oil is added to the polymer solution and mixed and the resulting oil-extended modified rubber solution is desolvated to obtain the oil-extended polymer composition of the present invention.

Also, a rubber composition for vulcanization, comprising 100 parts by weight of the oil-extended butadiene-based polymer of the present invention, from 20 to 100 parts by weight of a silica-based filler and from 1.0 to 20 parts by weight of a vulcanizing agent and a vulcanization accelerator, is preferably formed. In this case, the effects of the present invention are good dispersibility of silica and stabilized excellent performance of the vulcanized rubber. In the usage for tire tread, higher enhancement than ever is obtained, for example, in the balance between low rolling resistance and wet skid resistance, the wear resistance and the strength, and this composition is suitable for tire rubbers, anti-vibration rubbers and the like.

In the case of using the composition for a vulcanized rubber of automobile parts such as tire and antivibration rubber, a silica-based inorganic filler is suitably used as the reinforcer, and a synthetic silicic acid having a primary particle diameter of 50 nm or less is particularly preferred. As for the synthetic silicic acid, wet silica or dry silica is preferably used.

Carbon black can also be used as the reinforcer. The carbon black is not particularly limited, and examples of the carbon black which can be used include furnace black, acetylene black, thermal black, channel black and graphite. Among these, furnace black is preferred. A vulcanized rubber composition obtained by further compounding from 1 to 50 parts by weight of carbon black in the vulcanized rubber composition of the present invention is preferred. In this case, electrical conductivity is imparted and the wear resistance is more enhanced.

Also, an organosilane coupling agent can be used in the vulcanized rubber composition of the present invention. The organosilane coupling agent is added to achieve a close coupling action (mutual bonding action) between the reinforcing silica filler and the raw material rubber, preferably in an amount of 0.1 to 20 wt % based on the silica-based filler. If the amount of the organosilane coupling agent exceeds 20 wt %, the reinforcing property may be impaired. The amount of the organosilane coupling agent is more preferably from 0.1 to 6 wt % based on the amount of the silica-based filler.

The organosilane coupling agent has a polymer double bond within the molecule and has an affinity group or a coupling group on the silica surface. Examples thereof include bis-[3-(triethoxysilyl)-propyl]-tetrasulfide, bis-[3-(triethoxysilyl)-propyl]-disulfide, bis-[2-(triethoxy-silyl)-ethyl]-tetrasulfide, 3-mercaptopropyltrimethoxy-silane, 3-triethoxysilylpropyl-N,N-dimethylthiocarbamoyl-tetrasulfide and 3-triethoxysilylpropylbenzothiazole tetrasulfide. In the present invention, the rubbery polymer having a specific modification component has a high binding performance to the silica-based filler and therefore, a high-performance rubber composition can be rather obtained by not using an organosilane coupling agent or reducing the amount of the silane coupling agent as compared with the case of using other polymers.

In the present invention, the polymer of the present invention is used alone or, if desired, as a mixture with another rubber. In the case of using the polymer as a mixture with another rubber, if the proportion of the polymer of the present invention is excessively small, the modification effect of the present invention is not satisfactorily brought out and this is disadvantageous. Examples of the other rubber include natural rubber, polyisoprene rubber, emulsion-polymerized styrene-butadiene copolymer rubber, solution-polymerized random SBR (bound styrene: from 5 to 50 wt %; 1,2-vinyl bond amount in the butadiene bond unit moiety: from 10 to 80%), high-trans SBR (1,4-trans bond amount in the butadiene bond unit moiety: from 70 to 95%), low-cis polybutadiene rubber, high-cis polybutadiene rubber, high-trans polybutadiene rubber (1,4-trans bond amount in the butadiene bond unit moiety: 70 to 95%), styrene-isoprene copolymer rubber, butadiene-isoprene copolymer rubber, solution-polymerized random styrene-butadiene-isoprene copolymer rubber, emulsion-polymerized random styrene-butadiene-isoprene copolymer rubber, emulsion-polymerized styrene-acrylonitrile-butadiene copolymer rubber, acrylonitrile-butadiene copolymer rubber, high vinyl SBR-low vinyl SBR block copolymer rubber, and a block copolymer such as polystyrene-polybutadiene-polystyrene block copolymer. These other rubbers may be appropriately selected according to the properties required.

In the case where the polymer of the present invention and another rubber are used as the rubber component, the ratio of respective components is, in terms of the weight ratio, usually 10 to 95:90 to 5, preferably 20 to 90:80 to 10, more preferably 30 to 80:70 to 20.

As regards the rubber compounding agent, for example, a reinforcer, a vulcanizing agent, a vulcanization accelerator, a vulcanization aid and an oil may be further used.

The vulcanizing agent is not particularly limited but examples thereof include a sulfur such as powder sulfur, precipitated sulfur, colloidal sulfur, insoluble sulfur and highly dispersible sulfur, a sulfur halide such as sulfur monochloride and sulfur dichloride, and an organic peroxide such as dicumyl peroxide, di-tertiary butyl peroxide. Among these, a sulfur is preferred, and powder sulfur is more preferred.

The ratio of the vulcanizing agent compounded is usually from 0.1 to 15 parts by weight, preferably from 0.3 to 10 parts by weight, more preferably from 0.5 to 5 parts by weight, per 100 parts by weight of the rubber component.

Examples of the vulcanization accelerator include sulfenamide-based, thiourea-based, thiazole-based, dithio-carbamic acid-based and xanthic acid-based vulcanization accelerators. The ratio of the vulcanization accelerator compounded is usually from 0.1 to 15 parts by weight, preferably from 0.3 to 10 parts by weight, more preferably from 0.5 to 5 parts by weight, per 100 parts by weight of the rubber component. The vulcanization aid is not particularly limited but, for example, stearic acid or zinc oxide can be used.

As for the oil, an extender soil such as aromatic oil, naphthene-based oil, paraffin-based oil and silicone-based oil is selected according to the usage and added at the compounding.

The rubber composition for vulcanization, using the modified butadiene-based polymer composition of the present invention, may contain as usual, in addition to those components described above, a filler such as calcium carbonate and talc, an amine-based or phenol-based age resistor, an ozone deterioration inhibitor, a silane coupling agent, an activator such as diethylene glycol, a processing aid, a tackifier, and other compounding agents such as wax, each in a necessary amount.

The rubber composition for vulcanization, using the modified butadiene-based polymer composition of the present invention, is produced by mixing those components described above using a known rubber-kneading machine such as roll and Banbury mixer.

The modified butadiene-based polymer composition of the present invention may be formed as a master batch by adding various additives such as silica-based filler and carbon black, if desired. In this case, a rubber composition assured of good processability and excellent in the strength property, low rolling resistance, wet skid resistance and wear resistance is provided.

EXAMPLES

The present invention is described in greater detail below by referring to Examples and Comparative Examples, but the present invention is not limited to these Examples.

The analysis of sample was performed by the following methods.

(1) Bound Styrene Amount

The sample was formed into a chloroform solution and the bound styrene amount (wt %) was measured from the absorption of UV 254 nm by the phenyl group of styrene.

(2) Microstructure of Butadiene Moiety

The sample was formed into a carbon disulfide solution, the infrared spectrum was measured using a solution cell in the range of 600 to 1,000 cm$^{-1}$, and the microstructure of the butadiene moiety was determined from a predetermined absorbance in accordance with the calculation formula of the Hampton's method.

(3) Mooney Viscosity

The viscosity 4 minutes after preheating at 100° C. for 1 minute was measured in accordance with JIS K 6300-1. An L-type rotor was used.

(4) Molecular Weight and Molecular Weight Distribution

The chromatogram was measured by GPC having three connected columns using a polystyrene-based gel as the filler, and the molecular weight and molecular weight distribution were calculated from a calibration curve by using standard polystyrene. As for the solvent, tetrahydrofuran was used.

(5) Modification Ratio

By utilizing the property of the modified component adsorbing to a GPC column using silica gel as the filler, a sample solution containing the sample and a low molecular weight internal standard polystyrene was subjected to measurement of both chromatograms of GPC on the polystyrene-based gel in 5 above (Shodex, produced by Showa Denko K.K.) and GPC on a silica-based column (Zorbax, produced DuPont), the adsorption amount to the silica column was measured from the difference therebetween, and the modification ratio was determined therefrom.

In advance of tests, butadiene and styrene containing various impurities shown in Table 1 were prepared.

Example 1

Two polymerization reactors each having an inner volume of 10 liter, having an inlet at the bottom and an outlet at the top and being equipped with a stirrer and a jacket for the temperature adjustment were connected, and one static mixer was connected downstream the outlet of the second reactor. After mixing 16.38 g/min of butadiene (B1) shown in Table 1, 8.82 g/min of styrene (S1) and 132.3 g/min of n-hexane, the resulting mixed solution was passed through a dehydration column packed with active alumina, further mixed with n-butyl lithium at a rate of 0.00378 g/min (0.0591 mmol) in a static mixer immediately before entering the reactor to remove impurities and continuously fed to the bottom of the first reactor. Furthermore, 2,2-bis(2-oxolanyl) propane at a rate of 0.015 g/min as the polar substance and n-butyl lithium at a rate of 0.00504 g/min (0.0788 mmol) as the polymerization initiator were fed to the bottom of the reactor. The internal temperature of the reactor was kept at 73° C.

The polymer solution was continuously taken out from the top of the first reactor and continuously fed to the bottom of the second reactor, and the reaction was continued at 75° C. The reaction solution was further fed to the static mixer from the top of the second reactor and while keeping the temperature in the static mixer at 73° C., tetraglycidyl-1,3-bisaminomethylcyclohexane which is a tetrafunctional polyepoxy compound and has an amino group within the molecule was added at a rate of 0.0394 mmol/min to the copolymer solution continuously flowing into the static mixer, thereby effecting the modification reaction. An antioxidant (BHT) was continuously added to this modified polymer solution at a rate of 0.05 g/min (n-hexane solution) to terminate the modification reaction, and 37.5 parts by weight of an aromatic oil (X-140, produced by Japan Energy Co., Ltd.) was added to the resulting copolymer solution per 100 parts by weight of the polymer, whereby Oil-Extended Copolymer A was obtained. The Mooney viscosity of the oil-extended copolymer obtained was 77, the number average molecular weight (Mn) was 530,000, and the molecular weight distribution Mw/Mn was 1.90 and monomodal. The bound styrene amount of the modified copolymer before oil extension was 35 wt %, the vinyl bond amount in the butadiene was 39%, and the modification ratio was 78%. Incidentally, the yield at the outlet of the second reactor was 100%, and the residence time in pipeline to the static mixer after polymerization was 1 minute. Previously oil-extending a polymer having a high molecular weight, that is, a high Mooney viscosity is heretofore widely performed in the rubber industry because this facilitates the production of the copolymer obtained or in the subsequent process, provides an effect of enhancing the processability such as mixing with filler or enhancing the dispersion of filler and in turn enhancing the performance. The analytical values of the modified copolymer obtained are shown in Table 2.

Examples 2 to 12

Polymerization and modification were performed in the same manner as in Example 1 except for changing the amount of 2,2-bis(2-oxolanyl)propane, the amount of n-butyl lithium as the polymerization initiator, the amount of tetraglycidyl-1,3-bisaminomethylcyclohexane, the kind of butadiene, the polymerization temperature and the modification temperature to the conditions shown in Table 2. The analytical values of the modified copolymers (B to K) obtained are shown in Table 2. The molecular weight distribution was monomodal.

In Example 4, a mixed product (Process NC-140, trade name) of RAE produced by Japan Energy Co., Ltd. and paraffin oil was used in place of the aromatic oil (X-140).

Comparative Example 1

One reactor having an inner volume of 10 liter, having an inlet at the bottom and an outlet at the top and being equipped with a stirrer and a jacket for the temperature adjustment was used, and one static mixer was connected downstream the outlet of the reactor. After mixing 16.38 g/min of butadiene (B1) shown in Table 1, 8.82 g/min of styrene (S1) and 132.3 g/min of n-hexane, the resulting mixed solution was passed through a dehydration column packed with active alumina, further mixed with n-butyl lithium at a rate of 0.0038 g/min (0.0591 mmol) in a static mixer immediately before entering the reactor to remove impurities and continuously fed to the bottom of the reactor. Furthermore, 2,2-bis(2-oxolanyl)propane at a rate of 0.024 g/min as the polar substance and n-butyl lithium at a rate of 0.0063 g/min (0.0984 mmol) as the polymerization initiator were fed to the bottom of the reactor, and the internal temperature of the reactor was kept at 73° C. The polymer solution was continuously taken out from the top of the reactor and fed to the static mixer and while keeping the temperature in the static mixer at 85° C., tetraglycidyl-1,3-bisaminomethylcyclohexane which is a tetrafunctional polyepoxy compound was added at a rate of 0.0492 mmol/min to the copolymer solution continuously flowing into the static mixer, thereby effecting the modification reaction.

An antioxidant (BHT) was continuously added to this modified polymer solution at a rate of 0.05 g/min (n-hexane solution) to terminate the modification reaction, and 37.5 parts by weight of an aromatic oil (X-140, produced by Japan Energy Co., Ltd.) was added to the resulting copolymer solution per 100 parts by weight of the polymer, whereby an oil-extended copolymer (L) was obtained. The Mooney viscosity of the oil-extended copolymer obtained was 72, the number average molecular weight (Mn) was 430,000, and the molecular weight distribution Mw/Mn was 2.2 and monomodal. The bound styrene amount of the modified copolymer before oil extension was 35 wt %, the vinyl bond amount in the butadiene was 39%, and the modification ratio was 70%.

Comparative Examples 2 to 7

Polymerization and modification were performed in the same manner as in Comparative Example 1 except for changing the amount of 2,2-bis(2-oxolanyl)propane, the amount of n-butyl lithium as the polymerization initiator, the amount of tetraglycidyl-1,3-bisaminomethylcyclohexane, the polymerization temperature and the modification temperature to the conditions shown in Table 3. The analytical values of the modified copolymers (M to R) obtained are shown in Table 3.

Comparative Example 8

Two reactors each having an inner volume of 10 liter, having an inlet at the bottom and an outlet at the top and being equipped with a stirrer and a jacket for the temperature adjustment were connected, and one static mixer was connected downstream the outlet of the second reactor. After mixing 16.38 g/min of butadiene (B3) shown in Table 1, 8.82 g/min of styrene (S1) and 132.3 g/min of n-hexane, the resulting mixed solution was passed through a dehydration column packed with active alumina, further mixed with n-butyl lithium at a rate of 0.00378 g/min (0.0591 mmol) in a static mixer immediately before entering the reactor to remove impurities and continuously fed to the bottom of the first reactor. Furthermore, 2,2-bis(2-oxolanyl)propane at a rate of 0.015 g/min as the polar substance and n-butyl lithium at a rate of 0.00504 g/min (0.0788 mmol) as the polymerization initiator were fed to the bottom of the reactor. The internal temperature of the reactor was kept at 73° C.

The polymer solution was continuously taken out from the top of the first reactor and continuously fed to the bottom of the second reactor, and the reaction was continued at 75° C. The reaction solution was further fed to the static mixer from the top of the second reactor and while keeping the temperature in the static mixer at 73° C., tetraglycidyl-1,3-bisaminomethylcyclohexane which is a tetrafunctional polyepoxy compound was added at a rate of 0.0394 mmol/min to the copolymer solution continuously flowing into the static mixer, thereby effecting the modification reaction. An antioxidant (BHT) was continuously added to this modified polymer solution at a rate of 0.05 g/min (n-hexane solution) to terminate the modification reaction, and 37.5 parts by weight of an aromatic oil (X-140, produced by Japan Energy Co., Ltd.) was added to the resulting copolymer solution per 100 parts by weight of the polymer, whereby an oil-extended copolymer (S) was obtained. The Mooney viscosity of the oil-extended copolymer obtained was 85, the number average molecular weight (Mn) was 480,000, and the molecular weight distribution Mw/Mn was 2.40 and monomodal. The bound styrene amount of the modified copolymer before oil extension was 34.8 wt %, the vinyl bond amount in the butadiene was 40%, and the modification ratio was 50%. The yield at the outlet of the second reactor was 99%. The analytical values of the modified copolymer obtained are shown in Table 3.

Comparative Examples 9 to 13

Polymerization and modification were performed in the same manner as in Comparative Example 8 except for changing the amount of n-butyl lithium for removing impurities, the amount of 2,2-bis(2-oxolanyl)propane, the amount of n-butyl lithium as the polymerization initiator, the amount of tetraglycidyl-1,3-bisaminomethylcyclohexane, the kind of butadiene, the polymerization temperature and the modification temperature to the conditions shown in Table 3. The analytical values of the modified copolymers (T to X) obtained are shown in Table 3. In Comparative Example 13, the molecular weight became very high and the oil extension amount was increased to 50 parts. The oil-extended Mooney viscosity was 103, but the viscosity of the polymer solution and also the Moony viscosity after oil extension were high and this is estimated to cause deterioration of workability in view of production as well as at the compounding and kneading operation and give rise to bad processability and in turn impaired physical properties, implying that there is a problem in practical use.

Comparative Example 14

One reactor having an inner volume of 10 liter and being equipped with a stirrer and a jacket and capable of controlling the temperature was used. After charging 560 g of butadiene (B1), 350 g of styrene (S1), 5,500 g of cyclohexane, and 0.17 g of 2,2-bis(2-oxolanyl)propane as the polar substance into the reactor, the internal temperature of other reactor was kept at 40° C. A cyclohexane solution containing 0.55 g of n-butyl lithium as the polymerization initiator was fed to the reactor and after the initiation of reaction, the internal temperature of the reactor gradually rose due to heat generation by the polymerization. Over 5 minutes after the internal temperature of the polymerization vessel reached 65° C., 90 g of butadiene (B1) was fed at a rate of 16 g/min. The internal temperature of the reactor finally reached 77° C. After the completion of reaction, 0.54 g of tetraglycidyl-1,3-bisaminomethylcyclohexane was added as the modifier to the reactor, and the modification reaction was performed while keeping at 74° C. for 5 minutes. An antioxidant (BHT) in an amount of 2 g was added to the resulting modified copolymer solution, and 37.5 parts by weight of an aromatic oil (X-140, produced by Japan Energy Co., Ltd.) was further added to the copolymer solution per 100 parts by weight of the polymer, whereby an oil-extended copolymer (Y) was obtained. The Mooney viscosity of the oil-extended copolymer obtained was 48, the number average molecular weight (Mn) was 480,000, Mw/Mn was 1.65, and the shape of the molecular weight distribution was polymodal. The bound styrene amount of the modified copolymer before oil extension was 35.0 wt %, the vinyl bond amount in the butadiene was 39%, and the modification ratio was 76%. The analytical values of the modified copolymer obtained are shown in Table 3.

Examples 13 to 19 and Comparative Examples 15 to 20

Rubber compounds using the samples shown in Tables 2 and 3 as the raw material rubber were obtained according to the formulation shown in Table 4 by the following kneading method.

[Kneading Method]

In a Banbury-type closed kneader (inner volume: 1.7 liter) equipped with a temperature controlling device using external circulating water, a raw material rubber, fillers (silica and carbon black), an organosilane coupling agent, an additional aromatic oil, zinc white and stearic acid were kneaded as the first-stage kneading under the conditions of a filling rate of 65% and a rotor rotation number of 66/77 rpm. After cooling the compound obtained to room temperature, an age resistor was added thereto, and the compound was again kneaded as the second-stage kneading to enhance the dispersion of silica. Also in this case, the discharge temperature was adjusted by the temperature of the mixer.

After cooling, sulfur and a vulcanization accelerator were kneaded as the third-stage kneading in an open roll set at 70° C. The kneaded material was molded and vulcanized in a vulcanizing press at 160° C. for a predetermined time, and the following physical properties showing the tire performance were measured. The results are shown in Table 5.

Examples 19 and Comparative Example 19 were performed according to the formulation shown in Table 4 except for using 50 parts by weight of aromatic oil, 73 parts by weight of silica and 7 parts by weight of carbon black.

1) Bound Rubber Amount

The composition (0.2 g) sampled after the completion of second-stage kneading was cut into square pieces of about 1 mm and placed in a Harris's basket (made of a 100-mesh metal cloth), and the weight was measured. After dipping in toluene for 24 hours, the weight was again measured. The amount of rubber bound to the filler was calculated from the amount of undissolved components and used as the bound rubber amount.

2) Mooney Viscosity of the Compound

The viscosity 4 minutes after preheating at 130° C. for 1 minute was measured using a Mooney viscometer in accordance with JIS K 6300-1. An L-type rotor was used.

3) Tensile Strength

Measured by the tensile test method of JIS K 6251.

4) Fuel-Cost Saving Performance

Tested by Tan δ at 50° C. Measured using an ARES viscoelasticity tester manufactured by Rheometric in a twist mode at a frequency of 10 Hz, a distortion of 3% and 50° C. A smaller numeral reveals better fuel-cost saving performance.

5) Wet Skid Resistance

Tested by Tan δ at 0° C. Measured using an ARES viscoelasticity tester manufactured by Rheometric in a twist mode at a frequency of 10 Hz, a distortion of 3% and 0° C. A larger numeral reveals better wet skid resistance.

6) Wear Resistance

The wear resistance was determined by measuring the wear amount with use of an Akron wear tester under a load of 6 pounds at 1,000 rotations and formulating the obtained value into an index. A larger index is better.

As apparent from Tables 2 and 3, when a monomer containing allenes and acetylenes each in a specific amount is treated with an organic metal compound and the polymerization and modification are performed in two or more connected polymerization reactors at a specific temperature, the polymer can be produced at a high yield and a modified conjugated diene-based polymer having a high modification ratio and a high molecular weight can be obtained. Also, as apparent from Table 5, the vulcanized rubber composition using the modified conjugated diene-based polymer produced by the production method of the present invention has good fuel-cost saving property, is assured of excellent balance with wet skid resistance and is excellent in the strength and wear resistance, as compared with the modified diene-based polymer compositions of Comparative Examples, which are the same silica-containing formulation but out of the scope of the present invention.

[Table 1]

TABLE 1

Butadiene and Styrene Compositions

| Monomer | Allene Amount (ppm) | | Acetylene Amount (ppm) | | | | Total Impurity Amount, ppm |
|---|---|---|---|---|---|---|---|
| | 1,2-Butadiene | Propadiene | Methyl-acetylene | Ethyl-acetylene | Vinyl-acetylene | Phenyl-acetylene | |
| Butadiene B1 | 40 | 10 | 5 | 5 | 20 | — | 80 |
| Butadiene B2 | 80 | 30 | 10 | 10 | 40 | — | 150 |
| Butadiene B3 | 170 | 50 | 25 | 25 | 70 | — | 340 |
| Styrene S1 | — | — | — | — | — | 70 | 70 |

[Table 2]

TABLE 2

| | Example 1 | Example 2 | Example 3 | Example 4 | Example 5 | Example 6 |
|---|---|---|---|---|---|---|
| Butadiene used | B1 | B1 | B1 | B1 | B1 | B2 |
| Styrene used | S1 | S1 | S1 | S1 | S1 | S1 |
| Total impurity amount, ppm | 78 | 78 | 78 | 78 | 78 | 122 |
| Butadiene (g/min) | 16.38 | 16.38 | 16.38 | 16.38 | 16.38 | 16.38 |
| Styrene (g/min) | 8.82 | 8.82 | 8.82 | 8.82 | 8.82 | 8.82 |
| Polymerization temperature, ° C., first unit/second unit | 73/75 | 73/75 | 75/79 | 75/79 | 73/75 | 75/79 |
| n-Butyl lithium used for treatment (mmmol/min) | 0.0591 | 0.0591 | 0.0591 | 0.0591 | 0.0591 | 0.0591 |

TABLE 2-continued

| | | | | | | |
|---|---|---|---|---|---|---|
| n-Butyl lithium as polymerization initiator (mmol/min) | 0.0788 | 0.0748 | 0.0670 | 0.0635 | 0.0670 | 0.0670 |
| Polar substance | BOP | BOP | BOP | BOP | BOP | BOP |
| Amount added of polar substance (g/min) | 0.015 | 0.023 | 0.014 | 0.017 | 0.021 | 0.014 |
| Modifier | TGAMH | TGAMH | TGAMH | TGAMH | TGAMH | TGAMH |
| Amount added of modifier, mmol/min | 0.0394 | 0.0374 | 0.0350 | 0.0340 | 0.0374 | 0.0350 |
| Modification temperature, °C. | 73 | 73 | 75 | 75 | 73 | 75 |
| Reaction ratio (%) | 100 | 100 | 100 | 100 | 100 | 100 |
| Modification ratio | 78 | 73 | 72 | 71 | 68 | 65 |
| 37.5 Parts by weight oil-extended Mooney viscosity | 77 | 78 | 86 | 84 | 84 | 83 |
| Bound styrene amount (%) | 35.0 | 35.0 | 35.0 | 35.0 | 35.0 | 34.9 |
| 1,2-Vinyl bond amount (%) | 39 | 54 | 39 | 46 | 53 | 39 |
| Weight average molecular weight (Mw) ten thousand | 101 | 102 | 113 | 121 | 112 | 112 |
| Number average molecular weight (Mn) ten thousand | 53 | 51 | 58 | 62 | 56 | 56 |
| Mw/Mn | 1.9 | 2.0 | 1.95 | 1.95 | 2.0 | 2.0 |
| Sample No. | A | B | C | D | E | F |

| | Example 7 | Example 8 | Example 9 | Example 10 | Example 11 | Example 12 |
|---|---|---|---|---|---|---|
| Butadiene used | B2 | B2 | B1 | B1 | B2 | B1 |
| Styrene used | S1 | S1 | S1 | S1 | S1 | S1 |
| Total impurity amount, ppm | 122 | 122 | 78 | 78 | 122 | 78 |
| Butadiene (g/min) | 16.38 | 16.38 | 16.38 | 16.38 | 16.38 | 16.38 |
| Styrene (g/min) | 8.82 | 8.82 | 8.82 | 8.82 | 8.82 | 8.82 |
| Polymerization temperature, °C., first unit/second unit | 75/79 | 80/84 | 73/75 | 73/75 | 73/75 | 66/80 |
| n-Butyl lithium used for treatment (mmmol/min) | 0.0591 | 0.0591 | 0.0591 | 0.0591 | 0.0591 | 0.0591 |
| n-Butyl lithium as polymerization initiator (mmol/min) | 0.0630 | 0.0630 | 0.0571 | 0.0571 | 0.0571 | 0.0571 |
| Polar substance | BOP | BOP | BOP | BOP | BOP | BOP |
| Amount added of polar substance (g/min) | 0.014 | 0.016 | 0.011 | 0.011 | 0.011 | 0.010 |
| Modifier | TGAMH | TGAMH | TGAMH | TGAMH | TGAMH | TGAMH |
| Amount added of modifier, mmol/min | 0.0315 | 0.0315 | 0.0281 | 0.0281 | 0.0281 | 0.0281 |
| Modification temperature, °C. | 75 | 83 | 72 | 72 | 80 | 80 |
| Reaction ratio (%) | 99 | 100 | 100 | 100 | 99 | 100 |
| Modification ratio | 60 | 54 | 60 | 59 | 56 | 56 |
| 37.5 Parts by weight oil-extended Mooney viscosity | 90 | 85 | 93 | 93 | 94 | 96 |
| Bound styrene amount (%) | 34.8 | 35 | 35 | 35 | 35 | 35 |
| 1,2-Vinyl bond amount (%) | 39 | 40 | 39 | 39 | 40 | 39 |
| Weight average molecular weight (Mw) ten thousand | 122 | 118 | 125 | 123 | 127 | 130 |
| Number average molecular weight (Mn) ten thousand | 58 | 55 | 64 | 63 | 62 | 65 |
| Mw/Mn | 2.1 | 2.15 | 1.95 | 1.95 | 2.05 | 2.00 |
| Sample No. | G | H | I | I' | J | K |

BOP: 2,2-Bis(2-oxolanyl)propane
TGAMH: Tetraglycidyl-1,3-bisaminomethylcyclohexane
In Example 4, Process NC140 produced by Japan Energy Co., Ltd. was added.

[Table 3]

TABLE 3

| | Comparative Example | | | | | | |
|---|---|---|---|---|---|---|---|
| | 1 | 2 | 3 | 4 | 5 | 6 | 7 |
| Butadiene used | B1 | B1 | B1 | B1 | B1 | B1 | B1 |
| Styrene used | S1 | S1 | S1 | S1 | S1 | S1 | S1 |
| Total impurity amount, ppm | 78 | 78 | 78 | 78 | 78 | 78 | 78 |
| Butadiene (g/min) | 16.38 | 16.38 | 16.38 | 16.38 | 16.38 | 16.38 | 16.38 |
| Styrene (g/min) | 8.82 | 8.82 | 8.82 | 8.82 | 8.82 | 8.82 | 8.82 |
| Polymerization temperature, °C., first unit/second unit | 87/— | 87/— | 97/— | 73/— | 97/— | 87/— | 87/— |
| n-Butyl lithium used for treatment (mmmol/min) | 0.0591 | 0.0591 | 0.0591 | 0.0591 | 0.0591 | 0.0591 | 0.0591 |
| n-Butyl lithium as polymerization initiator (mmol/min) | 0.0984 | 0.0945 | 0.0984 | 0.0984 | 0.0906 | 0.0827 | 0.0788 |
| Polar substance | BOP | BOP | BOP | BOP | BOP | BOP | BOP |
| Amount added of polar substance (g/min) | 0.024 | 0.045 | 0.031 | 0.018 | 0.029 | 0.022 | 0.022 |
| Modifier | TGAMH | TGAMH | TGAMH | TGAMH | TGAMH | TGAMH | TGAMH |

TABLE 3-continued

| Amount added of modifier, mmol/min | 0.0492 | 0.0492 | 0.0492 | 0.0246 | 0.0453 | 0.0414 | 0.0394 |
|---|---|---|---|---|---|---|---|
| Modification temperature, °C. | 85 | 85 | 95 | 70 | 95 | 85 | 85 |
| Reaction ratio (%) | 100 | 100 | 100 | 91 | 100 | 98 | 97 |
| Modification ratio | 70 | 65 | 56 | 82 | 46 | 52 | 45 |
| 37.5 Parts by weight oil-extended Mooney viscosity | 72 | 70 | 80 | 60 | 90 | 86 | 87 |
| Bound styrene amount (%) | 35.0 | 35.0 | 35.0 | 32.3 | 35.0 | 34.2 | 33.8 |
| 1,2-Vinyl bond amount (%) | 39 | 55 | 38 | 38 | 38 | 38 | 39 |
| Weight average molecular weight (Mw) ten thousand | 95 | 94 | 109 | 72 | 118 | 113 | 119 |
| Number average molecular weight (Mn) ten thousand | 43 | 41 | 42 | 39 | 47 | 49 | 53 |
| Mw/Mn | 2.2 | 2.3 | 2.6 | 1.85 | 2.5 | 2.25 | 2.25 |
| Sample No. | L | M | N | O | P | Q | R |

|  | Comparative Example | | | | | | Comparative Example 14 |
|---|---|---|---|---|---|---|---|
|  | 8 | 9 | 10 | 11 | 12 | 13 |  |
| Butadiene used | B3 | B3 | B1 | B1 | B3 | B2 | B1 |
| Styrene used | S1 | S1 | S1 | S1 | S1 | S1 | S1 |
| Total impurity amount, ppm | 246 | 246 | 78 | 78 | 246 | 122 | 78 |
| Butadiene (g/min) | 16.38 | 16.38 | 16.38 | 16.38 | 16.38 | 16.38 |  |
| Styrene (g/min) | 8.82 | 8.82 | 8.82 | 8.82 | 8.82 | 8.82 |  |
| Polymerization temperature, °C., first unit/second unit | 73/75 | 75/79 | 73/75 | 75/79 | 75/79 | 79/84 |  |
| n-Butyl lithium used for treatment (mmmol/min) | 0.0591 | 0.0591 | 0 | 0 | 0.0887 | 0.0591 |  |
| n-Butyl lithium as polymerization initiator (mmol/min) | 0.0788 | 0.0670 | 0.1379 | 0.1261 | 0.0374 | 0.0380 |  |
| Polar substance | BOP | BOP | BOP | BOP | BOP | BOP |  |
| Amount added of polar substance (g/min) | 0.015 | 0.014 | 0.015 | 0.014 | 0.014 | 0.013 |  |
| Modifier | TGAMH | TGAMH | TGAMH | TGAMH | TGAMH | TGAMH |  |
| Amount added of modifier, mmol/min | 0.0394 | 0.0350 | 0.0498 | 0.0473 | 0.0350 | 0.0230 |  |
| Modification temperature, °C. | 73 | 75 | 73 | 75 | 75 | 83 |  |
| Reaction ratio (%) | 99 | 98 | 97 | 96 | 99 | 98 | 100 |
| Modification ratio | 50 | 44 | 46 | 40 | 53 | 40 | 76 |
| 37.5 Parts by weight oil-extended Mooney viscosity | 85 | 88 | 85 | 90 | 84 | 103 | 48 |
| Bound styrene amount (%) | 34.8 | 34.5 | 33.3 | 33.0 | 34.5 | 34.5 | 35 |
| 1,2-Vinyl bond amount (%) | 40 | 40 | 41 | 41 | 40 | 41 | 39 |
| Weight average molecular weight (Mw) ten thousand | 115 | 122 | 118 | 127 | 118 | 158 | 79 |
| Number average molecular weight (Mn) ten thousand | 48 | 53 | 48 | 52 | 48 | 72 | 48 |
| Mw/Mn | 2.4 | 2.3 | 2.45 | 2.45 | 2.45 | 2.2 | 1.65 |
| Sample No. | S | T | U | V | W | X | Y |

BOP: 2,2-Bis(2-oxolanyl)propane
TGAMH: Tetraglycidyl-1,3-bisaminomethylcyclohexane

[Table 4]

TABLE 4

(Compounding Formulation)

| | |
|---|---|
| Modified butadiene-based polymer (oil-extended) | 137.5 parts |
| Silica (Ultrasil VN3, produced by Degussa) | 63.0 parts |
| Carbon (Seast KH, produced by Tokai Carbon Co., Ltd.) | 7.0 parts |
| Silane coupling agent (Si69, produced by Degussa) | 6.3 parts |
| Zinc white | 2.5 parts |
| Stearic acid | 1.0 part |
| Age resistor (N-isopropyl-N'-phenyl-P-phenylenediamine) | 2.0 parts |
| Sulfur | 1.1 parts |
| Vulcanization accelerator (N-cyclohexyl-2-benzothiazylsulfenamide) | 1.7 parts |
| Vulcanization accelerator (diphenyl guanidine) | 2.0 parts |
| Total | 224.1 |

[Table 5]

TABLE 5

| | Sample | Modification Ratio % | Mn, ten thousand | Bound Rubber, % | Strength, MPa | 0° C. Tanδ | 50° C. Tanδ | Wear Resistance |
|---|---|---|---|---|---|---|---|---|
| Comparative Example 15 | L | outside the present | 70 | 43 | 46 | 22.4 | 0.71 | 0.195 | 100 |
| Comparative Example 16 | N | invention | 56 | 42 | 43 | 22.1 | 0.70 | 0.215 | 97 |

TABLE 5-continued

| Sample | | Modification Ratio % | Mn, ten thousand | Bound Rubber, % | Strength, MPa | 0° C. Tanδ | 50° C. Tanδ | Wear Resistance |
|---|---|---|---|---|---|---|---|---|
| Comparative Example 17 | Q | | 52 | 49 | 43 | 23.1 | 0.70 | 0.205 | 104 |
| Comparative Example 18 | T | | 44 | 53 | 42 | 23.8 | 0.68 | 0.205 | 106 |
| Comparative Example 19 | X | | 40 | 72 | 38 | 24.0 | 0.71 | 0.205 | 107 |
| Comparative Example 20 | Y | | 76 | 48 | 43 | 22.5 | 0.70 | 0.187 | 100 |
| Example 13 | A | present invention | 78 | 53 | 54 | 24.5 | 0.75 | 0.155 | 115 |
| Example 14 | C | | 72 | 58 | 54 | 25.5 | 0.74 | 0.160 | 118 |
| Example 15 | D | | 71 | 62 | 57 | 24.6 | 0.74 | 0.156 | 114 |
| Example 16 | F | | 65 | 56 | 51 | 25.1 | 0.73 | 0.165 | 116 |
| Example 17 | H | | 54 | 55 | 48 | 24.8 | 0.73 | 0.175 | 113 |
| Example 18 | I | | 60 | 64 | 52 | 26.0 | 0.72 | 0.150 | 123 |
| Example 19 | I' | | 59 | 63 | 48 | 24.1 | 0.74 | 0.170 | 111 |

While the present invention has been described in detail and with reference to specific embodiments thereof, it will be apparent to one skilled in the art that various changes and modifications can be made thereto without departing from the spirit and scope thereof.

This application is based on Japanese Patent Application No. 2005-094601 filed Mar. 29, 2005, and the contents thereof are herein incorporated by reference.

INDUSTRIAL APPLICABILITY

The modified butadiene-based polymer composition is assured of good fuel-cost saving property and good balance with wet skid resistance and excellent in the strength and wear resistance and is suitably used for applications, mainly tires, for which a butadiene-based polymer rubber has been conventionally used, or other industrial products and the like.

The invention claimed is:

1. An oil-extended polymer composition comprising 100 parts by weight of (A) a butadiene-based polymer, and from 20 to 60 parts by weight of (B) an extender oil, wherein said (A) butadiene-based polymer has a number average molecular weight Mn of 500,000 to 700,000, a molecular weight distribution Mw/Mn of 1.8 to 2.3, and wherein said (A) butadiene-based polymer has a polymer component having a molecular weight of 100,000 or more, a molecular weight distribution of said polymer component is monomodal, and a vinyl content of the butadiene unit of 20 to 80 mol %, and wherein 50 wt % or more of the polymer (A) is a functional group-containing polymer component to be is adsorbed to silica, and wherein the polymer (A) is formed from a polymerization reaction continuously performed in two or more connected reactors.

2. The oil-extended polymer composition according to claim 1, wherein said butadiene-based polymer (A) having a functional group-containing polymer component is a modified butadiene-based polymer modified using an organic compound having a molecular weight of 1,000 or less and having both an amino group and an epoxy group.

3. A rubber composition for vulcanization, comprising 100 parts by weight of the oil-extended polymer composition according to claim 1, from 20 to 100 parts by weight of a silica-based filler and from 1.0 to 20 parts by weight each of a vulcanizing agent and a vulcanization accelerator.

4. A method of making a modified butadiene based polymer having a number average molecular weight Mn of 500,000 to 700,000, a molecular weight distribution Mw/Mn of 1.8 to 2.3, and wherein said modified butadiene-based polymer has a polymer component having a molecular weight of 100,000 or more, a molecular weight distribution of said polymer component is monomodal, a vinyl content of the butadiene unit of 20 to 80 mol %, wherein 50 wt % or more of the modified butadiene-based polymer is a functional group-containing polymer component to be adsorbed to silica, comprising performing polymerization of 1,3-butadiene monomer or copolymerization of monomers of 1,3-butadiene and another copolymerizable conjugated diene and/or aromatic vinyl compound using an organic lithium compound as an initiator in a hydrocarbon solvent to obtain a butadiene-based polymer, reacting an active end of the butadiene based polymer with a readable functional group-containing compound, wherein (1) total amount of acetylenes and allenes as impurities is less than 200 ppm based on all monomers, (2) supplying all or part of the monomer for polymerization or copolymerization, optionally with hydrocarbon solvent to a polymerization reactor after treatment with an organic metal compound, (3) continuously polymerizing the monomer or copolymerizing all the monomers by using two or more connected polymerization reactors, and (4) performing the polymerization at a temperature of 50 to 85° C., and wherein the butadiene based polymer is formed from a polymerization reaction continuously performed in two or more connected reactors.

* * * * *

UNITED STATES PATENT AND TRADEMARK OFFICE
CERTIFICATE OF CORRECTION

| | | |
|---|---|---|
| PATENT NO. | : 9,493,629 B2 | Page 1 of 1 |
| APPLICATION NO. | : 11/887473 | |
| DATED | : November 15, 2016 | |
| INVENTOR(S) | : Haruo Yamada et al. | |

It is certified that error appears in the above-identified patent and that said Letters Patent is hereby corrected as shown below:

In the Claims

Claim 4, Column 26, Line 45, "readable" should read --reactable--.

Signed and Sealed this
Sixth Day of June, 2017

Michelle K. Lee
*Director of the United States Patent and Trademark Office*